(12) United States Patent
Chitrapu

(10) Patent No.: US 6,853,628 B2
(45) Date of Patent: Feb. 8, 2005

(54) SYSTEM FOR FACILITATING PERSONAL COMMUNICATIONS WITH MULTIPLE WIRELESS TRANSMIT/RECEIVE UNITS

(75) Inventor: Prabhakar R. Chitrapu, Blue Bell, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/334,190

(22) Filed: Dec. 30, 2002

(65) Prior Publication Data

US 2004/0001457 A1 Jan. 1, 2004

Related U.S. Application Data

(60) Provisional application No. 60/392,201, filed on Jun. 28, 2002.

(51) Int. Cl.[7] ................................................ H04Q 7/00
(52) U.S. Cl. ........................................ 370/328; 370/519
(58) Field of Search .................................. 370/390, 432, 370/338, 335, 328; 455/518, 519

(56) References Cited

U.S. PATENT DOCUMENTS

| | | | | |
|---|---|---|---|---|
| 5,748,736 A | * | 5/1998 | Mittra | 380/21 |
| 5,893,091 A | * | 4/1999 | Hunt et al. | 707/3 |
| 5,960,341 A | | 9/1999 | LeBlanc et al. | |
| 6,141,347 A | * | 10/2000 | Shaughnessy | 370/390 |
| 6,151,514 A | * | 11/2000 | Cheng et al. | 455/564 |
| 6,304,556 B1 | * | 10/2001 | Haas | 370/254 |
| 6,577,609 B2 | * | 6/2003 | Sharony | 370/312 |
| 6,591,098 B1 | * | 7/2003 | Shieh et al. | 455/419 |
| 6,606,706 B1 | * | 8/2003 | Li | 713/162 |
| 6,654,602 B1 | * | 11/2003 | Fye et al. | 455/414 |

* cited by examiner

Primary Examiner—Kenneth Vanderpuye

(57) ABSTRACT

A system for supporting security and mobility management of wireless communications to multiple wireless transmit/receive units (WTRUs) includes a first database having a listing of each of the WTRUs along with their capabilities, and a second database having a listing of the location of each of the WTRUs. The second database has at least one subgroup which corresponds to at least two WTRUs which are co-located. The WTRUs in the subgroup are treated as a single WTRU for security and mobility management.

15 Claims, 3 Drawing Sheets

WTRU DATABASE 22

50 — WTRU GROUP

| GROUP ID | MEMBER WTRUs | PROXIMITY |
|---|---|---|
| 1 - COMPANY 1 | WTRU 1, WTRU 2, WTRU 3 | |
| 2 - ASSOCIATION 1 | WTRU 1, WTRU 5, WTRU 6 | |
| 3 - ASSOCIATION 2 | WTRU 2, WTRU 3, WTRU 4 | |
| 4 - ASSOCIATION 3 | WTRU 5, WTRU 6 | YES |
| | | |
| N - | | |

52 — (header row)
54 — (rows bracket)

*FIG. 3*

80 — WTRU INDIVIDUAL          84

| ATTRIBUTE | DETAILS | |
|---|---|---|
| ADDRESS | UNIQUE IDENTIFICATION | |
| BEARER CAPABILITIES | RADIO INTERFACES, DATA RATER, QoS PARAMETERS, ETC. | |
| SERVICE SUBSCRIPTIONS | VOICE, HIGH SPEED DATA, PRIORITY DATA, INSTANT MESSAGING SMS, MMS, ETC. | |
| LOCATION | GEO-COORDINATES/CELL LEVEL/LOCATION AREA LEVEL | |
| SECURITY STATUS | (AUTHENTICATION/AUTHORIZATION) | |
| RECOGNIZED WTRUs | IDs OF OTHER WTRUs | |
| SECURITY BINDING | (TO OTHER WTRUs AND THE GROUP) | |
| WTRU CONNECTIVITY | WTRU # | CHARACTERIZATION (BLUETOOTH, LAN, ETC.) |
| | 1 | |
| | 2 | |
| | ⋮ | ⋮ |
| | N | |

*FIG. 4*

SYSTEM FOR FACILITATING PERSONAL COMMUNICATIONS WITH MULTIPLE WIRELESS TRANSMIT/RECEIVE UNITS

This application claims priority from U.S. Provisional Patent Application Ser. No. 60/392,201 filed Jun. 28, 2002 which is incorporated by reference as if fully set forth.

BACKGROUND

The present invention is directed to personal communication systems. More particularly, the invention is a system for facilitating personal communications of a user having multiple types of electronic devices.

In view of the tremendous array of electronic devices currently available, individuals currently have multiple different types of equipment for fulfilling their communication needs. For example, a cell phone may be used for voice or data communications, a PDA for calendaring and appointments, a laptop for corporate and personal uses. Additional equipment may be located in an automobile, at work or at home. In the future, it is expected that the use of electronic communicating will only increase. Of particular interest is when some or all of the types of electronic devices are wireless devices.

In such situations where numerous wireless electronic devices, (hereinafter wireless transmit/receive units or WTRUs), are utilized by a single user to communicate, several technical problems arise concerning: 1) efficiency of signal transmissions to the user; 2) simple and robust security procedures; and 3) mobility management. In prior art systems, each WTRU is treated as a separate entity with its own address and communications. Security associations as well as mobility management is done separately for each WTRU.

With respect to the communication process, the traditional approach is to treat each WTRU as separate equipment with its own address and duplicate the communication processes, whether they be data transmission, user authentication or location updating. This results in reduced efficiency of the network due to multiple transmissions of user data; reduced user convenience due to multiple user authentications; increased signaling traffic; and inability to use smart routing algorithms due to separate location updating.

It would be desirable to have a personal communication system which promotes efficiency for signal transmissions to the user by including a simple and robust security procedure and by providing simple mobility management.

SUMMARY

The present invention is a system for facilitating personal communications with multiple WTRUs. By treating all the WTRUs as a single group and by providing a single group identity, the present invention uses multicasting for efficient transmission. If multiple types of WTRUs have common applications, then a single transmission followed by local synchronization among the WTRUs is used to increase transmission efficiency. With respect to security, by binding the security associations together, redundant user authentications are avoided. Mobility management procedures such as location updating can be done in a combined manner, so that the signaling is reduced. Furthermore, combined mobility management allows optimal routing.

BRIEF DESCRIPTION OF THE DRAWINGS

FIG. 3 is a diagram of a WTRU database exemplifying possible information related to the WTRU grouping.

FIG. 4 is a table having information associated with an individual

DETAILED DESCRIPTION OF THE PREFERRED EMBODIMENTS

Figure 1:
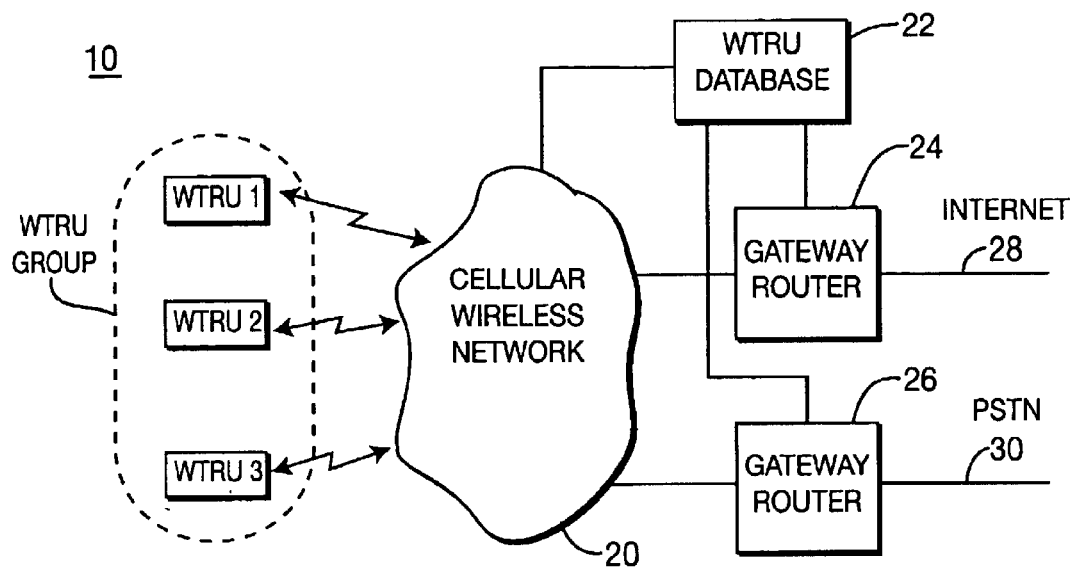
FIG. 1 is a diagram of a communications system made in accordance with the present invention.

The present invention will be described with reference to the drawings figures wherein like numerals represent like elements throughout. Referring to FIG. 1, a system 10 made in accordance with the present invention is shown. The system includes a plurality of WTRUs, (WTRU 1, WTRU 2, WTRU 3), a cellular wireless network 20, a WTRU database 22, a gateway router 24 and a gateway switch 26. The cellular wireless network 20 will be described hereinafter as a single wireless network from a single wireless service provider for simplicity of explanation. However, it should be recognized by those of skill in the art that the cellular wireless network may comprise a plurality of wireless operators. Although this introduces all of the concerns currently associated with roaming, the solution of the present invention is directly applicable to a multiple wireless service provider implementation. In such an application, the WTRU database 22 would be resident on the WTRU's home cellular wireless network 20.

The cellular wireless network 20 provides a wireless interface between the wireless WTRUs and the common elements of the system, namely the WTRU database 22, the gateway router 24 and the gateway switch 26. The WTRU database 22 is coupled to the cellular wireless network 20, the gateway router 24 and the gateway switch 26. The gateway router 24 provides an interface between the cellular wireless network 20 and the internet 28. The gateway switch 26 provides an interface between the cellular wireless network 20 and the public switch telephone network (PSTN) 30. As will be explained in detail hereinafter, the WTRU database 22 operates in conjunction with the gateway router 24 and the gateway switch 26 to seamlessly integrate communications to a particular WTRU group.

Figure 2:
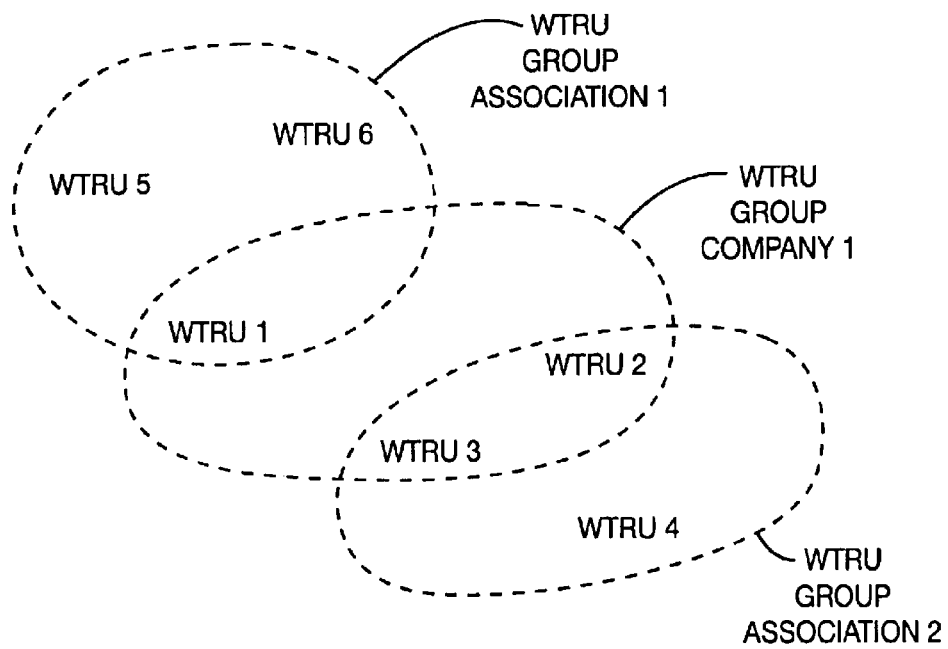
FIG. 2 illustrates WTRU grouping into group associations.

As used hereinafter, a WTRU "group" may refer to the multiple WTRUs of a single user, or may refer to the WTRUs of multiple users to be treated similarly with respect to certain communications, such as multiple users of a corporation. As such, a WTRU may be associated with multiple WTRU groups. For example, as shown in FIG. 2, WTRU 1, WTRU 2 and WTRU 3 may be associated with WTRU group company 1. WTRU 1 may also be part of WTRU group association 1 along with WTRU 5 and WTRU 6. Likewise, WTRU 2 and WTRU 3 may be part of WTRU group association 2 along with WTRU 4. It should also be noted that although the WTRU groups are labeled as an association or a company, they may pertain to any group, subgroup, family or individual. Accordingly, the WTRUs may be the multiple electronic devices associated with a particular user.

The WTRU database 22 will be described in more detail with reference to FIGS. 3 and 4. The WTRU database comprises two basic portions; information related to WTRU groups 50 and information regarding individual WTRUs 80. Referring to FIG. 3, the portion of the WTRU database 22 related to WTRU groups 50 is shown. The WTRU group 50 information comprises a group ID 52 and a listing of member WTRUs 54 that are associated with a particular group ID 52. For example, referring back to FIG. 2, WTRU group company 1 includes WTRU 1, WTRU 2 and WTRU 3. Accordingly, referring to FIG. 3, the first group ID 52 which is listed as company 1 includes three member WTRUs 54 which are WTRU 1, WTRU 2 and WTRU 3, Likewise, each group which is pictorially referred to in FIG. 2 has an associated group ID 52, a listing of member WTRUs 54 and proximity 56. As shown, there may be one or more member WTRUs 54 associated with a single group ID 52. Additionally, each WTRU may be associated with one or more group IDs 52. The proximity 56 column indicates that the member WTRUs are at the same location, such as in a car or office.

Referring to FIG. 4, the information associated with an individual WTRU 80 is shown. It should be noted that the information for an individual WTRU 80 is associated with each WTRU. The WTRU information block 80 comprises a plurality of attributes 82 along with the details 84 associated with each attribute.

Preferably, the attribute 82 field includes the address 86, the bearer capabilities 88, the service subscriptions 90, the location 92, the security status 94, the security binding 96 and the WTRU connectivity 98. The address 86 provides a unique identification to the WTRU 80. For example, the unique address may be a cellular phone number, and IP address or any other type of unique identification to which the cellular wireless network 20 can route a communication. The bearer capabilities 88 by the types of radio interfaces supported, the data rate, QoS parameters, etc. The service subscriptions 90 identify the cellular wireless network provider services to which the WTRU has subscribed. The location 92 provides the current location of the WTRU 80.

This location 92 may be the specific geo-coordinates such as that available via the global positioning system (GPS). The location may also be at the cell level or the location area level whereby the cell or location of the WTRU 80 is provided. It should also be noted that unlike many of the other attributes 82 shown in FIG. 4, the location 92 is preferably updated on a periodic basis as set by the user and/or the network, which may be "constantly" if overhead is not a concern or may be at successively lesser periodic intervals as overhead becomes a concern. The frequency of the updating may be dependent upon loading factors, whereby frequent updating may occur during low loading and less frequent updating my occur during high loading commissions. The recognized WTRU 95 field includes the identification's of all the groups to which the device belongs. This entry should be checked periodically to ensure it properly reflects the entries in WTRU group database 22.

The security status 94 includes the authentication and authorization status of the WTRU 80. The status field 94 specifies whether or not the WTRU is authenticated by the network or networks. It also specifies if the WTRU has been verified to be authorized to access a particular service or services. The security binding 96 refers to the other WTRUs in the groups to which the WTRU 80 is associated. Binding is only within a group, not across differing groups. The WTRU connectivity 98 describes the WTRUs to which the WTRU 80 is connected and characterizes each connection, such as whether the connection is Bluetooth, LAN, WAN or any other type of wireless or wired connection.

When a WTRU first accesses the network, it attempts to register with the network. During the registration process, all WTRU fields are updated including any binding data. Registration may only be performed during the initial contact or the system may allow for ongoing registration renewal.

Although FIG. 4 contains the list of the capabilities of each of the WTRU, it is intended that the present invention may also include other types and capabilities that are not listed therein. The attributes 82 listed in FIG. 4 are not intended to be exhaustive. Additionally, the specific functions of which each WTRU is capable is not central to the present invention. Location can be in terms of: a) geo-coordinates, b) a particular cell and c) a location area which typically consist of more than one cells. Any of these implementations would be acceptable for the invention.

One or more sub-groups may be defined to take into account that some of the WTRUs may physically be in the same location. Association 3 54 is a subgroup containing WTRU 5 and WTRU 6. If these two WTRUs are in the same approximate geographical location, in a car for example, the proximity indicator 56 for association 3 54 would be set to a "YES" in the WTRU individual database 80.

Preferably, whenever a WTRU changes its location, it does a location update to the network. If location is defined as geo-coordinates, this could result in a lot of signaling overhead. Accordingly, the WTRU may alternatively report only at some regular intervals of time. More generally, location is defined in terms of a location area (LA). A "LA" may be defined in terms of one or more cells or a WLAN hotspot or even in terms of geographic map information. The idea of course is that many situations are common. Whenever, a WTRU crosses a LA boundary, it will initiate a location update. Since we are dealing with a group of WTRUs, the usual location updates will also have to deal with updating 'connectivity status' among the WTRUs. This connectivity is one of the attributes of the Group.

Traditional mobility management involves location updates. In accordance with the present invention, location updating is generalized to include location updates to one or more of the separate WTRUs. As the physical grouping characteristics and/or the local connectivity of the WTRUs change, then the altered characteristics are updated as well. The gain in efficiency is achieved when at least two group members (WTRUs) are co-located allowing the signaling load to be reduced.

The second facet of the invention deals with the sending of data from a network to one or more of the WTRUs. The present invention links WTRUs to groups and assigns addresses which are stored in a database.

In a system with N wireless devices (WTRUs), each of these devices may be identified by addresses, such as WTRU1, D2 . . . Dn. The addresses allow packets or calls to be routed to the device. The addresses may be global, such as with IP addresses, telephone numbers, as per the International Telecommunication Union (ITU) recommendations, or may even be wireless network specific addresses which are not recognized outside of the wireless network.

Within the wireless/cellular network, these N wireless devices are defined to be a logical group G1, with an ID. The ID may be a wireless network specific multicast address, which allows the packet to be routed or it may simply be a label or a name. The multicast address may also be an IP address. A particular wireless device may also belong to more than one group.

The database of the present invention, as described in the above paragraphs, contains numerous characteristics about each WTRU as well as entries about each WTRU group. An example of the database entry for a single WTRU is shown in FIG. 4. An example of the database entry for a Group is shown in FIG. 3. It should be noted that in FIG. 4, the WTRU entry contains the usual descriptors of the device itself as well as information relating to the logical binding and connectivity to the other devices within the group or groups to which it belongs. The logical binding information consists of security associations and other associations. An alternative method is to store the logical binding information in the group entry or both.

In an embodiment of the present invention, optimal routes are prepared for data packets or calls. First a Group ID, which is a wireless network specific label or name, is determined. An IP packet which is addressed to one of the WTRUs, for example an IP packet for WTRU1 arrives at the Gateway Router. The Gateway Router consults the WTRU database and determines that WTRU1 belongs to Group G1. The Group G1 also includes WTRU5 and WTRU6 as illustrated in FIG. 2. The connectivity among WTRU1, WTRU5 and WTRU6 is then determined. Based on the connectivity information, an optimal route is prepared. To illustrate the routing, assume that the link from the Gateway Router to WTRU1 is of poor quality, the link to WTRU5 is of a good quality, and the link between WTRU1 and WTRU5 has a known good quality connection between themselves for example, Bluetooth and the WTRUs are in close proximity. The Packet may then be routed to WTRU5 and then relayed to WTRU1.

In another embodiment in which the WTRU1 does not have enough memory to store the entire IP packet or packets. In this situation, the packet may be sent to WTRU6 where it is stored. An alert signal is sent to WTRU1, which is followed by a subsequent forwarding of the packet to WTRU1.

In yet another embodiment is when a call comes in at the Gateway Switch destined to the device WTRU1. As in the first embodiment, assume that the link from Gateway Switch to WTRU1 is poor, the link to WTRU5 is good, and that WTRU1 and WTRU5 are well connected. The call is then forwarded to WTRU5 and relayed to WTRU1. In this embodiment the call or packet is not stored.

Another aspect of the invention deals with Group ID in a wireless network, specifically the use of Multicast addressing. To illustrate, assume that an IP packet has arrived at the Gateway Router, and the IP packet is destined to WTRU-WTRU1. The Gateway Router consults the WTRU database and determines that WTRU1 belongs to G1. The Gateway Router extracts the multicast address of the group G1 and multicasts the IP packet to all the individual WTRUs. When the IP packet is received by one or more of the WTRUs of G1, a positive acknowledgement is sent back to the Gateway Router. If WTRU1 was not one of the WTRUs that successfully received the IP packet, the Gateway Router multicasts a message to the group G1, requesting that just received IP packet be forwarded to WTRU1 via local connections.

When a packet of data is to be sent to one or more of the WTRUs, the network consults the WTRU database 22 and determines an optimal way to route the packet to the destined WTRUs.

Figure 5A:
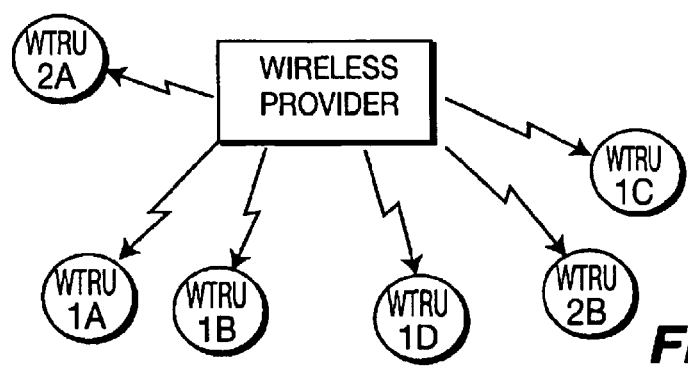
FIGS. 5A–5D are diagrams of different types WTRU multicasting related to the WTRU grouping.
Figure 5B:
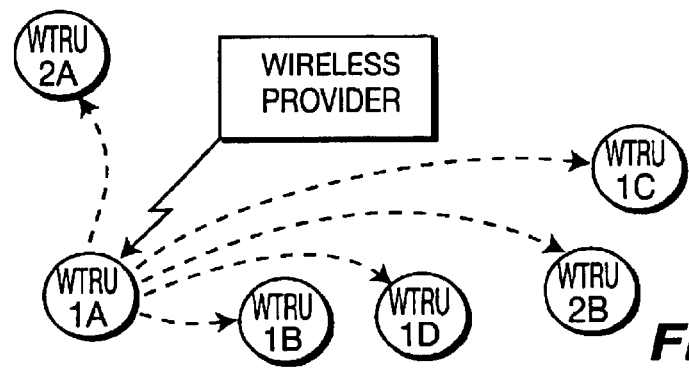
Figure 5C:
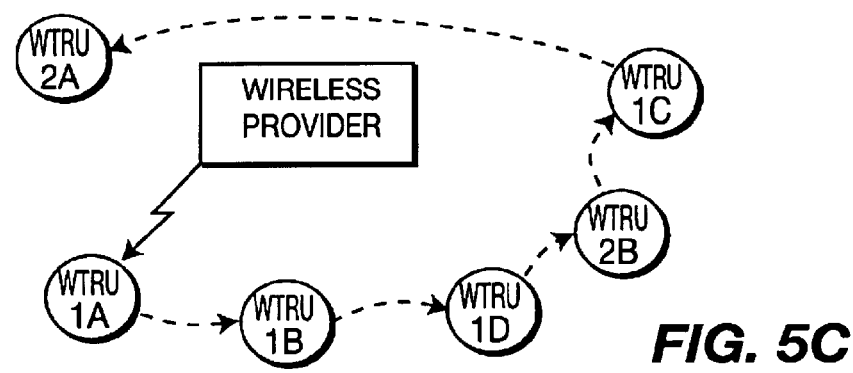
Figure 5D:
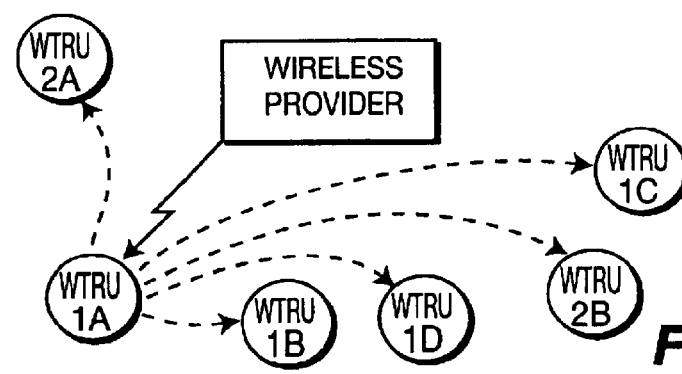

An embodiment shown in FIG. 5A uses IP-multicasting or any other type of layer-2 multicasting procedures. An alternative embodiment shown in FIG. 5B sends the packet to one destined WTRU and then lets the local network, such as Bluetooth, send it to other devices. Another embodiment shown in FIG. 5C sends the packet to one WTRU and uses it to relay the packet to the other WTRUs in a chained or an ad-hoc manner. A fourth embodiment shown in FIG. 5D is to send the packet to one WTRU and send alert signals to the other destined WTRUs. In this embodiment, a packet is stored only at one location and its presence is made known to all other destined WTRUs via an alert signal. If the WTRU which has stored the packet is unavailable, (powered down for example), then a transfer of the packet to another WTRU is performed. Additionally, if the application for which the packet is destined is a shared application among multiple WTRUs, then appropriate synchronizations are made upon receipt of the packet.

In still yet another facet of the invention is the efficient security solutions pertaining to a group of WTRUs, which have a single group ID. One of the key security protocols is user authentication.

One manifestation of this invention is that if one WTRU is authenticated, then all the remaining WTRUs in the group associated with the said first WTRU are also treated as being authenticated. Therefore, as soon as one WTRU is authenticated, its authentication status is updated in the WTRU database. At the same time, the authentication status of all remaining WTRUs is also updated. When all the WTRUs in the group become inactive, then the authentication status of all the WTRUs and hence the group is deactivated. In accordance with the present invention, if one WTRU is authenticated, then the entire group is authenticated. In most situations, different WTRUs will have varyingly security algorithms and procedures that may provide strong security for certain WTRUs or weak WTRUs for other WTRUs. For example, a laptop has a username-password authentication approach, compared to a cell phone which has a SIM approach.

Accordingly, the binding of the authentication status of the WTRUs may be explicitly specified using a set of rules. For example, WTRU1 may have a strong authentication scheme compared to WTRU2. Then, the rule may specify that if WTRU1 is authenticated, then WTRU2 is also considered authenticated, but not vice versa. Such collection of authentication rules forms the authentication binding. This binding information is also stored in the WTRU database, which needs to be duplicated for service authorization as well.

Accordingly, in one embodiment, the security status 94 and security binding 96 of each WTRU is stored in the WTRU database (as shown in FIG. 4), which contains the user subscription profile 90. This data will help facilitate the network to determine which WTRU should be used for which types of services. For example, for financial transactions, the WTRU with the highest level of security will be used. On the other hand, Internet browsing for stock quotes may be offered with lesser levels of security. In all cases, the network determines which particular WTRU or a sub-group of WTRUs must be used for providing authentication for the entire group.

Although the present invention has been described in detail, it is to be understood that the invention is not limited thereto, and that various changes can be made therein without departing from the spirit and scope of the invention, which is defined by the attached claims.

What is claimed is:

1. A system for supporting security and mobility management of wireless communications to multiple wireless transmit/receive units (WTRUs) including a database comprising:

a first database portion, having a listing of each of the WTRUs along with their capabilities; and a second database portion, having a listing of each of the WTRUs along with their location, said second database portion also having at least one subgroup which corresponds to at least two WTRUs which have a preexisting association whereby the WTRUs in said at least one subgroup are treated as a single WTRU for security and mobility management.

2. The system of claim 1 wherein said subgroup and said WTRUs are co-located.

3. The system of claim 1 wherein a change in one WTRU's location of said subgroup causes the WTRU to update said second database portion.

4. The system of claim 3 wherein said WTRU of said subgroup periodically updates its location.

5. The system of claim 1 wherein a location area is defined by a geographic location and the WTRU updates a location entry in the second database portion when a WTRU of a subgroup changes location areas.

6. The system of claim 1 wherein a location area is defined by a cell and the WTRU updates a location entry in the second database portion when a WTRU of a subgroup changes location area.

7. The system of claim 1 wherein a location area is defined by a plurality of cells and the WTRU updates a location entry in the second database portion when a WTRU of a subgroup changes location areas.

8. The system of claim 5 wherein an optimal routing path of a data packet destined for each WTRU of said subgroup is determine.

9. The system of claim 8, whereby said data packet is stored on a second WTRU of said subgroup before being relayed to a first WTRU of said subgroup.

10. The system of claim 8, whereby said data packet is stored on a third WTRU of said subgroup before being relayed through said second WTRU to said first WTRU of said subgroup.

11. The system of claim 8, whereby said data packet destined to a first WTRU of said subgroup is routed to a plurality of WTRUs of said subgroup and relayed to said first WTRU of said subgroup.

12. The system of claim 8, whereby said data packet destined to a first WTRU of said subgroup is routed to a fourth WTRU of said subgroup and relayed to a plurality of WTRUs of said subgroup.

13. The system of claim 12, whereby said data packet destined for said first WTRU of said subgroup is stored on said fourth WTRU until said first WTRU can receive said data packet.

14. The system of claim 10, whereby said data packet is stored on said fourth WTRU of said subgroup and relayed through said second WTRU of said subgroup to first WTRU of said subgroup.

15. The system of claim 1, wherein a subgroup of WTRUs have a security level set in said second database portion allowing all WTRUs of said subgroup to have the same security level.

* * * * *

UNITED STATES PATENT AND TRADEMARK OFFICE
CERTIFICATE OF CORRECTION

PATENT NO. : 6,853,628 B2
DATED : February 8, 2005
INVENTOR(S) : Prabbaker R. Chitrapu It is certified that error appears in the above-identified patent and that said Letters Patent is hereby corrected as shown below:

Column 4,
Line 62, after the word "The", delete "database" and insert therefor -- databases --.

Column 7,
Line 19, after the word "location", delete "area" and insert therefor -- areas --.
Line 26, after the word "is", delete "determine" and insert therefor -- determined --.

Signed and Sealed this

Ninth Day of August, 2005

JON W. DUDAS
*Director of the United States Patent and Trademark Office*